United States Patent [19]

Simmonds

[11] 4,260,873
[45] Apr. 7, 1981

[54] ELECTRICALLY HEATED HAND HELD VAPORIZER FOR VAPOR POLISHING PLASTIC SURFACES

[75] Inventor: Milo R. Simmonds, Williamsville, N.Y.

[73] Assignee: A-T-O Inc., Willoughby, Ohio

[21] Appl. No.: 952,493

[22] Filed: Oct. 18, 1978

[51] Int. Cl.³ .................. H05B 1/00; B05B 1/24; D06F 75/06; B01J 7/00
[52] U.S. Cl. .................. 219/273; 38/77.8; 38/77.83; 43/129; 68/222; 219/275; 219/302; 239/133; 239/136; 401/2; 422/305
[58] Field of Search .................. 219/271–276, 219/302; 68/222; 38/69, 77.1–77.9; 222/146 HE, 3; 239/133–136; 122/40, 41; 261/142, 72 R; 422/305, 306, 125; 43/128–130; 401/1, 2

[56] References Cited

U.S. PATENT DOCUMENTS

| | | | |
|---|---|---|---|
| 1,323,181 | 11/1919 | Goodfellow | 219/273 X |
| 1,633,568 | 6/1927 | Brewer | 422/305 |
| 2,291,423 | 7/1942 | Tiscornia | 219/273 X |
| 2,500,185 | 3/1950 | Kassab | 38/77.81 |
| 2,761,228 | 9/1956 | Zerveck | 38/77.3 |
| 2,849,736 | 9/1958 | Kohle | 68/222 X |
| 3,002,237 | 10/1961 | Spexarth | 219/273 X |
| 3,158,891 | 12/1964 | Long | 219/273 X |
| 3,200,535 | 8/1965 | Hession | 219/275 X |
| 3,609,890 | 10/1971 | Abraham | 38/77.83 |
| 3,814,898 | 6/1974 | Levine | 219/274 X |

FOREIGN PATENT DOCUMENTS 509374 7/1939 United Kingdom .............. 38/77.83

Primary Examiner—A. Bartis
Attorney, Agent, or Firm—Christel, Bean & Linihan

[57] ABSTRACT

A hand held apparatus for the vapor polishing of plastic surfaces by movement of the apparatus over a plastic surface to be polished includes a body portion defining a vaporizing chamber. A container for plastic solvent, such as methylene chloride, is mounted on one side of the body for flow of solvent into the chamber when the apparatus is positioned with the container disposed above the chamber, with the solvent flow being interrupted when the apparatus is inverted to dispose the container below the chamber. A thermostatically controlled electric heating element is disposed in the chamber for vaporizing the solvent. An open-end guide tube projects from the opposite side of the body and is in fluid communication with the chamber. The guide tube opens downwardly when the apparatus is positioned with the container disposed above the chamber for directing the vaporized solvent to the plastic surface to be polished. The body portion is provided with a handle for movement of the apparatus relative to the plastic surface.

9 Claims, 2 Drawing Figures

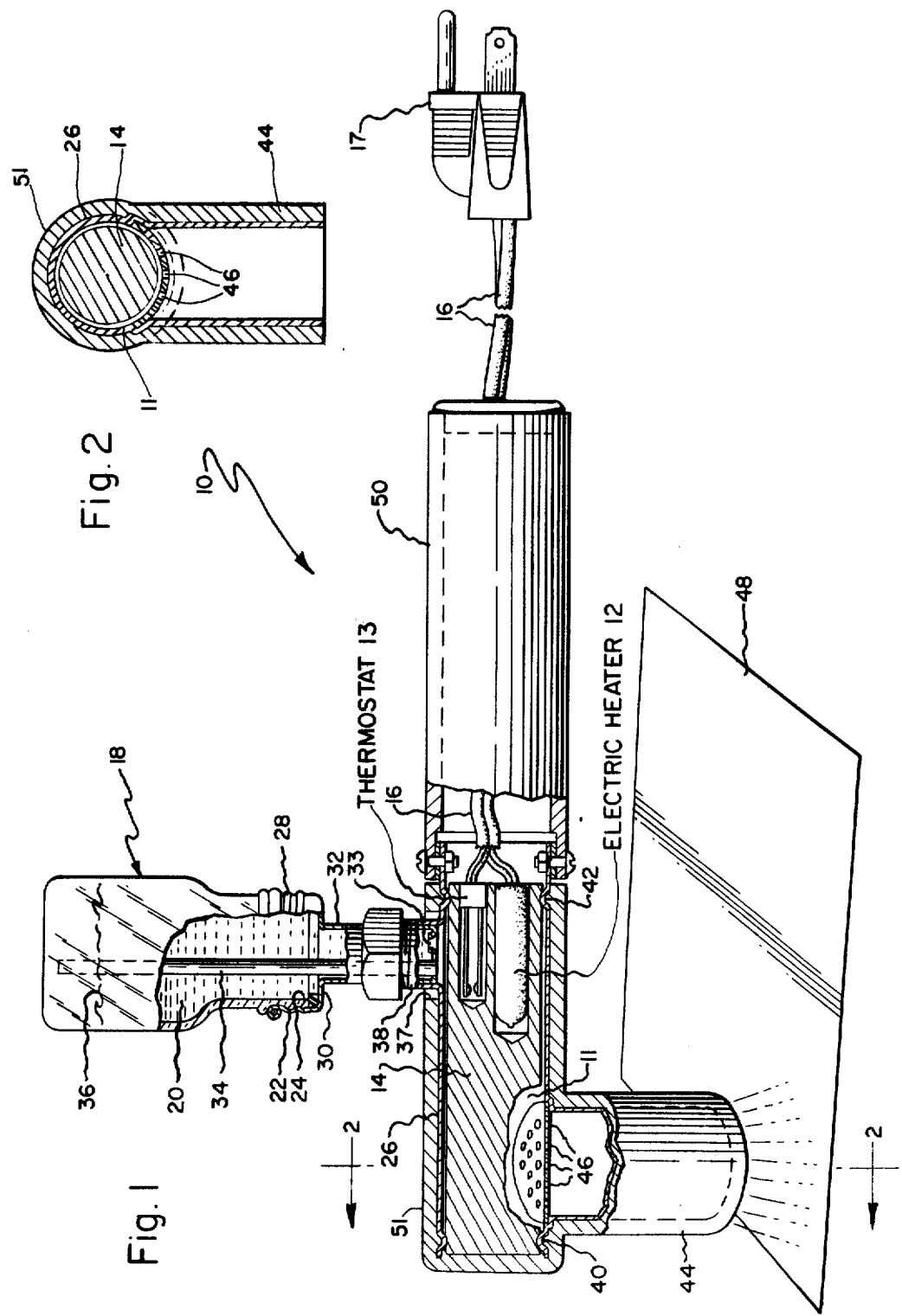

ELECTRICALLY HEATED HAND HELD VAPORIZER FOR VAPOR POLISHING PLASTIC SURFACES

BACKGROUND OF THE INVENTION (A) Field of the Invention

This invention relates to the polishing of plastic surfaces by means of a solvent vapor which permits penetration of solvent into the surface of a plastic article and creates an improved smoother surface after drying.

(B) History of the Prior Art

In the prior art, coating and plastic industries have always had some difficulty obtaining smooth, even and high gloss coatings or surfaces without exercising extreme care in the application or manufacture of a plastic or plastic coated article. The obtaining of smooth surfaces was usually accomplished by polishing, buffing or thermal baking techniques. Recently, it has been found that smooth surfaces can be obtained by spraying a solvent against a plastic surface to remove oxidized plastic and to dissolve uncovered plastic which, upon removal of the solvent, will form a smooth or fresh surface of clean plastic. Optionally, the surface could be treated with a solvent vapor which permits penetration of the liquid solvent deeper into the article, see eg. U.S. Pat. Nos. 3,327,033; 3,632,404 and 3,437,727.

Prior art vapor finishing processes and apparatus were usually cumbersome and complicated since the polishing operation required moving and handling the article through the apparatus, see eg. U.S. Pat. Nos. 3,737,499 and 3,020,661. Such processes and apparatus have definite disadvantages since the handling of the plastic article could itself result in marring the surface. Furthermore, the large complicated apparatus is generally too costly for general use.

SUMMARY OF THE INVENTION

Accordingly, it is the principal object of the present invention to provide a new and improved apparatus for the vapor polishing of plastic surfaces. In summary, the apparatus of the instant invention includes a body defining a chamber with an opening to the external environment. The apparatus further includes a container for holding a plastic solvent and means for mounting the container to a side wall of the chamber to be in fluid communication therewith. A heater is mounted within the chamber which will reach a temperature above the boiling point of the plastic solvent. Means are provided for transferring solvent from the container to the chamber and for transferring heat from the heater to the solvent within the chamber to vaporize the solvent in the chamber. The resulting vapor passes through the opening which guides the vapor to the external environment and upon the plastic surface to be polished.

The apparatus is generally sufficiently small and sufficiently light to be hand held and is therefore moved over the plastic surface which permits the plastic surface to remain stationary.

The foregoing and other objects, advantages, and characterizing features of the present invention will become clearly apparent from the ensuing detailed description of an illustrative embodiment thereof, taken together with the accompanying drawing wherein like reference characters denote like parts throughout the various views.

BRIEF DESCRIPTION OF THE DRAWING

FIG. 1 is a side view of the apparatus in accordance with the invention showing a cutaway portion.

FIG. 2 is a sectional view taken along line 2—2 of FIG. 1.

DETAILED DESCRIPTION OF THE INVENTION

In accordance with this invention, plastics which do not craze when exposed to solvents may be polished by use of the apparatus comprising the instant invention. Such a plastic would be polycarbonate.

The solvent which is used is selected on the basis of its ability to dissolve the particular plastic to be polished. Typical solvents are aliphatic and halogenated hydrocarbons such as methylene chloride, dichloroethane, 1,1,1-trichloroethane, trichloroethylene, perchloroethylene, chlorofluoromethane, trichlorotrifluoroethane, dibromotetrafluoroethane, tetrachlorodifluoroethane and petroleum napthas such as octane. Aromatic halogenated and non-halogenated hydrocarbons solvents such as toluene or chlorobenzene may also be used and for certain applications, sulfur, oxygen or nitrogen containing polar solvents, such as dimethylformamide and methylpyrollidone, may be useful. The most desirable solvents are usually halogenated hydrocarbons due to their low flammability.

The chamber 11 of the apparatus 10 is annular in form and is defined by the continuous side wall of cylindrical body 26 and the crimped ends 40 and 42 associated therewith which engage a heat exchanger 14. The chamber 11 includes a guide means in the form of openings 46 to direct vapor passing through the chamber to a surface to be polished. The effectiveness of the guide means may be increased by the attachment of a guide tube 44 to cylindrical wall 26 so that tube 44 operates to direct the vapor flowing through openings 46. Necessarily, cylinder 26, heat exchanger 14 and guide tube 44 could take on various configurations.

The container 18 for holding solvent and the wall surfaces defining the chamber 11 and tube 44 may be manufactured of any suitable material which would not be dissolved or weakened by the solvent. Examples of suitable materials are certain crosslinked plastics, glass or metal such as cast iron, copper, brass, steel, stainless steel or aluminum.

The means for mounting the container 18 to and through the side wall of the chamber 11 may be any suitable means which will permit the flow of solvent from container 18 to the chamber 11. Examples of such mounting means are clamp means wherein the mouth of the container is sealed against a gasket by clamp type pressure or the container may be provided with a screw type male portion peripherally around an opening in the container which is screwed into a matching screw type female closure portion secured to the side wall of the chamber. As shown, the body 26 includes an upwardly extending threaded sleeve 38 which is in open communication with chamber 11. An intermediate tube or conduit 32 is received within the threaded sleeve 38. The upper end of conduit 32 includes a female threaded portion 28 of appropriate size to receive the male threads 22 on the mouth of container 18. The female threaded portion 28 on conduit 32 is integrally formed with a bottom wall portion 30 associated therewith which effectively seals the opening 24 in the mouth of container 18. Conduit 32 is held in assembled position with respect to sleeve 38 by the engagement of a threaded nut over sleeve 38, as shown, whereby sleeve 38 is forced into firm engagement with conduit 32. A tube 34, to be described in detail hereinbelow, communicates in an unrestricted manner with the upper portion of container 18 above the surface 36 of the solvent therein and chamber 11. However, the lower end of conduit 32, through which tube 34 communicates with chamber 11, is formed to include a metering orifice 33 to control the flow of solvent downwardly into chamber 11. In this regard, conduit 32 may be on the order of ⅛" in diameter while orifice 33 may be on the order of 0.020 inches in diameter. The tube 34 functions to equalize the pressure in chamber 11 and the upper portion of container 18 above the surface 36 of the solvent therein. By this arrangement, there is a free gravity flow of the solvent into chamber 11 since the outward flow of the solvent does not tend to evacuate container 18.

A heating means 12 is mounted within the chamber and is shown as an electric heating element, although other types of heaters are conceivably possible such as a heater which functions through the burning of combustible gas. The means for transferring heat from the heater to the solvent within the chamber generally comprises a heat exchanger 14 surrounding and protecting the heater 12. As a practical matter, the solvent flowing to the chamber 11 contacts the heat exchanger 14 to be heated above its boiling point which in the case of methylene chloride is above about 40° C. The heater temperature, when methylene chloride is used, is usually between about 50° and about 65° C.

A thermostat 13 having a bimetallic element therein is in operative connection with the heating element 12 for purposes of controlling the operation thereof whereby the temperature level in chamber 11 can be maintained within a preselected range. As further shown in the drawing, an electric cord 16 with plug 17 connected thereto provides electricity to the heating element 12 and thermostat 13. A handle body 50 is provided whereby the apparatus may be held in a user's hand and easily manipulated. Another body 51 extends to encompass or encapsulate the cylindrical body 26 and to provide as an integral part thereof the guide tube 44.

In operation, the container 18 is disposed above the chamber 11 and solvent flows from the container through conduit 32 and orifice 33 to the heat exchanger 14 within the chamber 11 wherein the solvent is vaporized. The resulting vapor passes to the external environment through the guide openings 46 and associated tube 44 to a plastic surface 48 to be treated. The guide tube 44 opens downwardly when the container is disposed above the chamber 11. The downward opening permits vapor which is heavier than air to fall downwardly upon the plastic surface 48. An equilibrium is maintained between the pressure in container 18 and the pressure in chamber 11 by means of tube 34. If tube 34 were not provided, a vacuum would be created above solvent 20 as solvent 20 passes through tube 32 thus restricting and altering the flow of solvent 20 through tube 32 and associated orifice 33.

When vapor is no longer required, apparatus 10 may simply be inverted thereby thus preventing any further solvent from flowing by gravity through tube 32 to heat exchanger 14 in chamber 11.

The use of apparatus 10 permits the movement of apparatus 10 with respect to a plastic surface 48 during the vapor polishing operation thereby eliminating the requirement to move or handle plastic surface 48 during the polishing operation. The use of gravity feed to carry solvent 20 to heater 14 eliminates the need for more complicated solvent delivery arrangements. The flow of solvent 20 to heater 14 can simply be controlled by changing the position of the apparatus so that container 18 is disposed in a different position relative to heat exchanger 14 and flow may be stopped by inverting the apparatus so that container 18 is below heat exchanger 14.

From the foregoing, it is apparent that the objects of the present invention have been fully accomplished. As a result of this invention, an improved apparatus is provided for the vapor polishing of plastic material.

Having thus described and illustrated a preferred embodiment of my invention, it will be understood that much description and illustration is by way of example only and that such modifications and changes as may suggest themselves to those skilled in the art are intended to fall within the scope of the present invention as limited only by the appended claims.

What is claimed is:

1. A hand held apparatus for the vapor polishing of plastic surfaces by movement of the apparatus over a plastic surface to be polished, said apparatus comprising:
   (a) a body portion defining a chamber:
   (b) a container for plastic solvent;
   (c) means for mounting said container on one side of said body portion for flow of solvent from said container into said chamber when said apparatus is positioned with said container disposed above said chamber, with flow of solvent into said chamber being interrupted when said apparatus is inverted to dispose said container below said chamber;
   (d) heating means disposed within said chamber, said heating means being capable of generating heat sufficient to vaporize solvent flowing into said chamber from said container;
   (e) guide tube means projecting from the side of said body portion generally opposite said one side thereof, said guide tube means being in fluid communication with said chamber in spaced apart relation to said container mounting means and opening downwardly when said apparatus is positioned with said container disposed above said chamber whereby solvent flowing into said chamber is vaporized by said heating means and the resulting vapor passes through said guide tube means and is directed thereby to a plastic surface to be polished; and
   (f) handle means connected to said body portion for movement of said apparatus relative to the plastic surface to be polished.

2. The apparatus of claim 1 wherein said container means is mounted on a side wall of said body portion defining said chamber by means of an intermediate conduit means, said container having a screw type male portion peripherally around an opening therein which is received in a matching screw type female portion on one end of said conduit means.

3. The apparatus of claim 2 wherein the other end of said intermediate conduit means is received in a threaded sleeve extending outwardly from said side wall of said body portion defining said chamber and including a threaded nut means engaging said sleeve to retain said intermediate conduit means in a mounted disposition.

4. The apparatus of claim 3 including an orifice means disposed in said intermediate conduit means to control the flow of solvent therethrough.

5. The apparatus of claim 1 including fluid supply means for facilitating the flow of solvent from said container to said chamber, said fluid supply means comprising a pressure equalizing tube communicating at one end with said chamber and extending into said container, said pressure equalizing tube terminating proximate the upper portion of said container above the surface of contained solvent when said container is disposed above said chamber, thus permitting pressure to remain equalized in said chamber and said container.

6. The apparatus of claim 1 including means for transferring heat from said heating means to solvent flowing into said chamber, said means comprising a heat exchanger surrounding and protecting said heating means.

7. The apparatus of claim 6 further including a thermostat means in operative connection with said heating means to control operation of the latter.

8. The apparatus of claim 1 wherein said heating means is electrical.

9. The apparatus of claim 1 wherein said solvent is methylene chloride and the temperature of said heating means is between about 50° C. and about 65° C.

* * * * *